(12) United States Patent
Hashimoto et al.

(10) Patent No.: US 8,149,363 B2
(45) Date of Patent: Apr. 3, 2012

(54) LIQUID CRYSTAL DISPLAY DEVICE

(75) Inventors: Yoshito Hashimoto, Osaka (JP); Hiroyuki Ohgami, Osaka (JP); Masumi Kubo, Osaka (JP); Masayuki Soga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 97 days.

(21) Appl. No.: 12/679,053

(22) PCT Filed: Sep. 18, 2008

(86) PCT No.: PCT/JP2008/002569
§ 371 (c)(1),
(2), (4) Date: Jun. 24, 2010

(87) PCT Pub. No.: WO2009/037835
PCT Pub. Date: Mar. 26, 2009

(65) Prior Publication Data
US 2010/0283952 A1    Nov. 11, 2010

(30) Foreign Application Priority Data
Sep. 19, 2007 (JP) ................................. 2007-242568

(51) Int. Cl.
*G02F 1/1337* (2006.01)

(52) U.S. Cl. ........ 349/129; 349/123; 349/124; 349/125; 349/126; 349/127; 349/128

(58) Field of Classification Search ........... 349/123–129
See application file for complete search history.

(56) References Cited

U.S. PATENT DOCUMENTS

| 5,309,264 | A | 5/1994 | Lien et al. |
| 6,151,003 | A | 11/2000 | Tsuda et al. |
| 6,661,488 | B1 | 12/2003 | Takeda et al. |
| 6,862,062 | B2 | 3/2005 | Kubo et al. |
| 6,977,704 | B2 | 12/2005 | Kataoka |
| 7,169,449 | B2 | 1/2007 | Nakanishi et al. |
| 7,351,453 | B2 | 4/2008 | Ichinose et al. |
| 2003/0151703 | A1 | 8/2003 | Nakanishi et al. |

(Continued)

FOREIGN PATENT DOCUMENTS
EP    0 821 260 A1    1/1998
(Continued)

OTHER PUBLICATIONS

English International Preliminary Report on Patentability mailed Apr. 15, 2010 in corresponding PCT Application No. PCT/JP2008/002569.

(Continued)

*Primary Examiner* — Phu Vu
(74) *Attorney, Agent, or Firm* — Nixon & Vanderhye P.C.

(57) ABSTRACT

A VA-mode liquid crystal display device which includes a pair of alignment sustaining layers 34a and 34b formed by a photopolymerized material on surfaces of a pair of vertical alignment films 32a and 32b which are closer to a liquid crystal layer, and a cruciform opening 22a provided only in a counter electrode. When a predetermined voltage is applied across the liquid crystal layer, four liquid crystal domains are formed such that the azimuths of the directors of the respective liquid crystal domains are different from one another and form an angle of about 45' relative to the polarization axes of a pair of polarizing plates. When no voltage is applied across the liquid crystal layer, the pretilt azimuths of liquid crystal molecules included in regions respectively corresponding to the four liquid crystal domains are regulated by the alignment sustaining layers 34a and 34b.

6 Claims, 11 Drawing Sheets

U.S. PATENT DOCUMENTS

2005/0280761 A1  12/2005  Ishii
2006/0055858 A1  3/2006  Nakanishi et al.
2010/0302491 A1  12/2010  Usui et al.

FOREIGN PATENT DOCUMENTS

| JP | 2000-347174 | 12/2000 |
| JP | 2003-279957 | 10/2003 |
| JP | 2004-302261 | 10/2004 |

OTHER PUBLICATIONS

International Search Report for PCT/JP2008/002569, mailed Oct. 21, 2008.

International Search Report for PCT/JP2008/002873, mailed Nov. 18, 2008.

Supplementary EP Search Report mailed Aug. 31, 2010 in corresponding EP application 08838873.1.

Pauluth et al, "Advanced Liquid Crystals for Television", Journal of Material Chemistry Royal Society of Chemistry GB, vol. 14, No. 8, Apr. 21, 2004, pp. 1219-1227.

Reiffenrath et al, "Synthesis and Properties of Liquid Crystaline Materials with High Optical Anisotropy", Proceedings of the International Society for Optical Engineering (SPIE), SPIE, USA LNKD-DOI:10.1117/12.19930, vol. 1257, Jan. 1, 1990, pp. 84-94.

U.S. Office Action mailed Mar. 2, 2010 in U.S. Appl. No. 12/738,156.

600nm (a)

(b)

(a)

(b)

(a)

(b)

LIQUID CRYSTAL DISPLAY DEVICE

This application is the U.S. national phase of International Application No. PCT/JP2008/002569, filed 18 Sep. 2008, which designated the U.S. and claims priority to Japanese Patent Application No. 2007-242568, filed 19 Sep. 2007, the entire contents of each of which are hereby incorporated by reference.

TECHNICAL FIELD

The present invention relates to a liquid crystal display device and specifically to an alignment control structure preferably applied to a liquid crystal display device which has a relatively small pixel pitch.

BACKGROUND ART

Recently, as liquid crystal display devices which have high viewing angle characteristics, transverse electric field mode devices (including IPS mode devices and FES mode devices) and vertical alignment (VA) mode devices are used. The VA mode devices are superior to the transverse electric field mode devices in terms of mass production and therefore have been used in a wide variety of TV applications and mobile applications.

The VA mode liquid crystal display devices are generally classified into MVA mode devices (see Patent Document 1) and CPA mode devices (Patent Document 2).

In the MVA mode devices, alignment control means (slit or rib) which has linear portions extending in two directions perpendicular to each other is provided to form four liquid crystal domains between the alignment control means such that the azimuthal angles of the directors which are representative of the respective domains form angles of 45° relative to the polarization axes (transmission axes) of polarizing plates placed in crossed Nicole. Assuming that the azimuthal angle of 0° is identical with the 3 o'clock direction of the clock dial and that the counterclockwise direction is the positive direction, the azimuthal angles of the directors of the four domains are 45°, 135°, 225°, and 315°. This configuration is most preferable in terms of transmittance because linear polarization in the 45° direction relative to the polarization axes is not absorbed by the polarizing plates. Such a configuration in which four domains are formed in one pixel is referred to as "4-domain alignment structure" or simply "4D structure".

However, the above-described MVA mode is not suitable to small pixels (for example, the shorter side is less than 100 μm, specifically less than 60 μm). For example, when a slit is used as the alignment control means, the width of the slit need to be about 10 μm or more in order to produce a sufficient anchoring force. To form four domains, it is necessary to form in a counter electrode a slit including portions extending in directions which are different from each other by 90° when viewed in a direction normal to the substrate ("<"-shaped slit) and to form two "<"-shaped slits in a pixel electrode such that the two slits are disposed parallel to each other with a certain space therebetween relative to the counter electrode slit that is assumed as the center. Specifically, it is necessary to dispose the sets of three slits each having the width of about 10 μm so as to be in parallel to each other and to extend in the 45°-225° direction and the 135°-315° direction. If this configuration is applied to a pixel with the shorter side being less than 100 μm, the transmittance (luminance) greatly deteriorates because part of the pixel in which the slits (or ribs) are provided does not contribute to the display. In a small-size liquid crystal display device with higher resolution, for example, a 2.4-inch VGA device for use in mobile phones, the pitch of the pixels (row direction×column direction) is, for example, 25.5 μm×76.5 μm. In such small pixels, even formation of the above-described slit is impossible. As a matter of course, if the width of the slit is decreased, a sufficient anchoring force cannot be obtained.

Patent Document 1: Japanese Laid-Open Patent Publication No. H11-242225
Patent Document 2: Japanese Laid-Open Patent Publication No. 2002-202511
Patent Document 3: Japanese Laid-Open Patent Publication No. H06-43461
Patent Document 4: Japanese Laid-Open Patent Publication No. 2002-357830
Patent Document 5: Japanese Laid-Open Patent Publication No. 2006-78968

DISCLOSURE OF INVENTION

Problems to be Solved by the Invention

Because of the above circumstances, liquid crystal display devices with relatively small pixels employ the CPA mode. A structure of a CPA mode liquid crystal display device is briefly described with reference to FIGS. 11(a) to 11(c). FIG. 11(a) is a schematic cross-sectional view of one pixel of a CPA mode liquid crystal display device 90A. FIG. 11(b) is a schematic plan view of the pixel. FIG. 11(a) shows the alignment of liquid crystal molecules 42a in an intermediate gray scale level display state. FIG. 11(c) is a plan view schematically showing the alignment of the liquid crystal molecules in a white display state. Note that, in the drawings mentioned below, like elements are designated by like reference numerals, and the description thereof is sometimes omitted.

The liquid crystal display device 90A includes a vertical alignment type liquid crystal layer 42 between a pair of substrates 11 and 21. The liquid crystal layer 42 is alignment-controlled by vertical alignment films 32a and 32b. The liquid crystal molecules 42a have negative dielectric anisotropy. The azimuths in which the liquid crystal molecules 42a are inclined in the presence of an applied voltage are regulated by an oblique electric field generated at an edge portion of a pixel electrode 12 and an anchoring force of a rivet (protrusion) 92 provided on a side of a counter electrode 22 which is closer to the liquid crystal layer 42. Application of a sufficiently high voltage leads to an alignment in which the liquid crystal molecules 42a are radially inclined around the rivet 92 as shown in FIG. 11(c). In this case, the alignment of the liquid crystal molecules 42a is axially symmetric about the rivet 92. A domain which results in such an alignment is referred to as a "inclined alignment domain" or "axially symmetric alignment domain".

The liquid crystal display device 90A includes a pair of polarizing plates 52a and 52b which are disposed so as to oppose each other via the liquid crystal layer 42. The liquid crystal display device 90A includes ¼-wave plates (quarter-wave plates) 72a and 72b which are respectively disposed between the polarizing plates 52a and 52b and the liquid crystal layer 42. The polarizing plates 52a and 52b are disposed such that their polarization axes are perpendicular to each other (crossed Nicols arrangement). By utilizing an omniazimuthal, radially inclined alignment domain and circular polarization, high transmittance (luminance) can be achieved. FIG. 13(a) shows a simulation result of the distribution of transmittance in a pixel in a white (highest gray scale level) display state of the liquid crystal display device 90A. The result shows high transmittance uniformly achieved in the pixel except for a low transmittance region near the center of the rivet 92.

The CPA mode which uses ¼-wave plates achieves high transmittance but has the problems of low contrast ratio and narrow viewing angle as compared with the MVA mode. Specifically, when ¼-wave plates are used, a phenomenon where a state of display (especially, a state of display at a low gray scale level (low luminance)) which is perceived as being brighter when viewed at an oblique viewing angle than when viewed from a position in front of the display device (in a direction normal to the display surface, viewing angle 0°), so-called "whitening", is more conspicuous than in the MVA mode.

By omitting the ¼-wave plates 72a and 72b of the liquid crystal display device 90A, i.e., by combining the CPA mode and linear polarization, whitening is prevented, the contrast ratio is improved, and the viewing angle can be increased. However, the transmittance decreases as shown in FIG. 13(b). FIG. 13(b) shows a simulation result of the distribution of transmittance in a pixel in a white display state of a modification of the liquid crystal display device 90A from which the ¼-wave plates 72a and 72b are omitted. The result shows very low transmittance in a region where the orientations of the liquid crystal molecules are parallel to the absorption axes of the polarizing plates.

On the other hand, Patent Document 3 discloses that providing a cruciform slit in a counter electrode enables formation of four domains (FIG. 8, paragraph [0033]). A structure of a VA-mode liquid crystal display device 90B to which the structure of Patent Document 3 is applied is briefly described with reference to FIGS. 12(a) to 12(c). FIG. 12(a) is a schematic cross-sectional view of one pixel of the liquid crystal display device 90B. FIG. 12(b) is a schematic plan view of the pixel. FIG. 12(c) is a plan view schematically showing the alignment of the liquid crystal molecules in a white display state.

In the liquid crystal display device 90B, in the presence of an applied voltage, the azimuths in which the liquid crystal molecules 42a are inclined are regulated by an oblique electric field generated at an edge portion of the pixel electrode 12 and an oblique electric field generated near a slit (or "opening") 22a of a counter electrode 22. When the voltage applied across the liquid crystal layer 42 is sufficiently high, four domains are formed as shown in FIG. 12(c). Assuming that the horizontal slit of the cruciform opening 22a shown in FIG. 12(b) is identical with the X-axis and the vertical slit is identical with the Y-axis, the azimuthal angles of the directors of the respective domains formed in the first, second, third, and fourth quadrants of the pixel are 45°, 135°, 225°, and 315°. Therefore, the distribution of transmittance in a pixel in a white (highest gray scale level) display state of the liquid crystal display device 90B exhibits uniform high transmittance except for regions which are parallel to the absorption axes of the polarizing plates as shown in FIG. 13(c).

However, in the liquid crystal display device 90B, an anchoring force occurs only when a voltage is applied, whereas the rivet 92 of the liquid crystal display device 90A produces an anchoring force irrespective of the presence or absence of an electric field. Therefore, when the applied voltage is low, a sufficient anchoring force is not produced. Thus, the alignment of the liquid crystal molecules is unstable especially at gray scale levels lower than intermediate gray scale levels. Because of this problem, the liquid crystal display device 90B has not been put to practical use.

The present invention was conceived for the purpose of solving the above problems. One of the objects of the present invention is to provide a liquid crystal display device which has higher contrast ratio and wider viewing angle characteristics than those of the conventional liquid crystal display device which uses a combination of CPA mode and circular polarization, which has higher transmittance than that realized by a combination of CPA mode and linear polarization, and which enjoys stable alignment of liquid crystal molecules even at low gray scale levels.

Means for Solving the Problems

A liquid crystal display device of the present invention is a liquid crystal display device including a plurality of pixels and a pair of polarizing plates placed in crossed Nicols, the liquid crystal display device being configured to display an image in a normally black mode, wherein each of the plurality of pixels includes a liquid crystal layer including a nematic liquid crystal material whose dielectric anisotropy is negative, a pixel electrode and a counter electrode opposing each other via the liquid crystal layer, a pair of vertical alignment films respectively interposed between the pixel electrode and the liquid crystal layer and between the counter electrode and the liquid crystal layer, a pair of alignment sustaining layers formed by a photopolymerized material on respective surfaces of the pair of vertical alignment films which are closer to the liquid crystal layer, and at least one cruciform opening provided only in the counter electrode among the pixel electrode and the counter electrode, the cruciform opening being disposed so as to coincide with polarization axes of the pair of polarizing plates, when a predetermined voltage is applied across the liquid crystal layer, four liquid crystal domains are formed in the liquid crystal layer, azimuths of directors of the four liquid crystal domains that are representative of orientations of liquid crystal molecules included in the four liquid crystal domains being different from one another, and each of the directors forming an angle of about 45° relative to the polarization axes of the pair of polarizing plates, and when no voltage is applied across the liquid crystal layer, a pretilt azimuth of a liquid crystal molecule included in a region corresponding to each of the four liquid crystal domains is regulated by the alignment sustaining layers.

In one embodiment, the pixel electrode includes a plurality of subpixels aligned in a line along a certain direction, the at least one cruciform opening provided in the counter electrode includes an opening provided at a position opposing each of the plurality of subpixels, and when a predetermined voltage is applied across the liquid crystal layer, the four liquid crystal domains are formed in each of a plurality of subpixel regions corresponding to the plurality of subpixel electrodes on a one-to-one basis.

In one embodiment, the plurality of subpixel regions include a transmission subpixel region which performs display in a transmission mode and a reflection subpixel region which performs display in a reflection mode.

In one embodiment, the liquid crystal display device further includes a quarter-wave plate selectively provided only in a region corresponding to the reflection subpixel region.

In one embodiment, the photopolymerized material includes a polymerized material of any one of a diacrylate monomer or a dimethacrylate monomer, and the liquid crystal layer includes the monomer.

In one embodiment, the pair of alignment sustaining layers include a particle of the photopolymerized material which has a particle diameter of 50 nm or less.

Effects of the Invention

In a liquid crystal display device of the present invention, a cruciform opening (slit) is used to form a 4-domain alignment structure, and the pretilt azimuth of liquid crystal molecules in each domain is regulated by alignment sustaining layers. Thus, because of a combination of the 4D structure and linear polarization, the contrast ratio and the viewing angle characteristics are higher than those achieved by a combination of CPA and circular polarization, the transmittance is better than that achieved by a combination of CPA and linear polarization, and the alignment of the liquid crystal molecules is stable even at low gray scale levels.

BRIEF DESCRIPTION OF DRAWINGS

FIG. 1(a) is a plan view. FIG. 1(b) is a schematic cross-sectional view taken along line 1B-1B' of FIG. 1(a).

Figure 1:
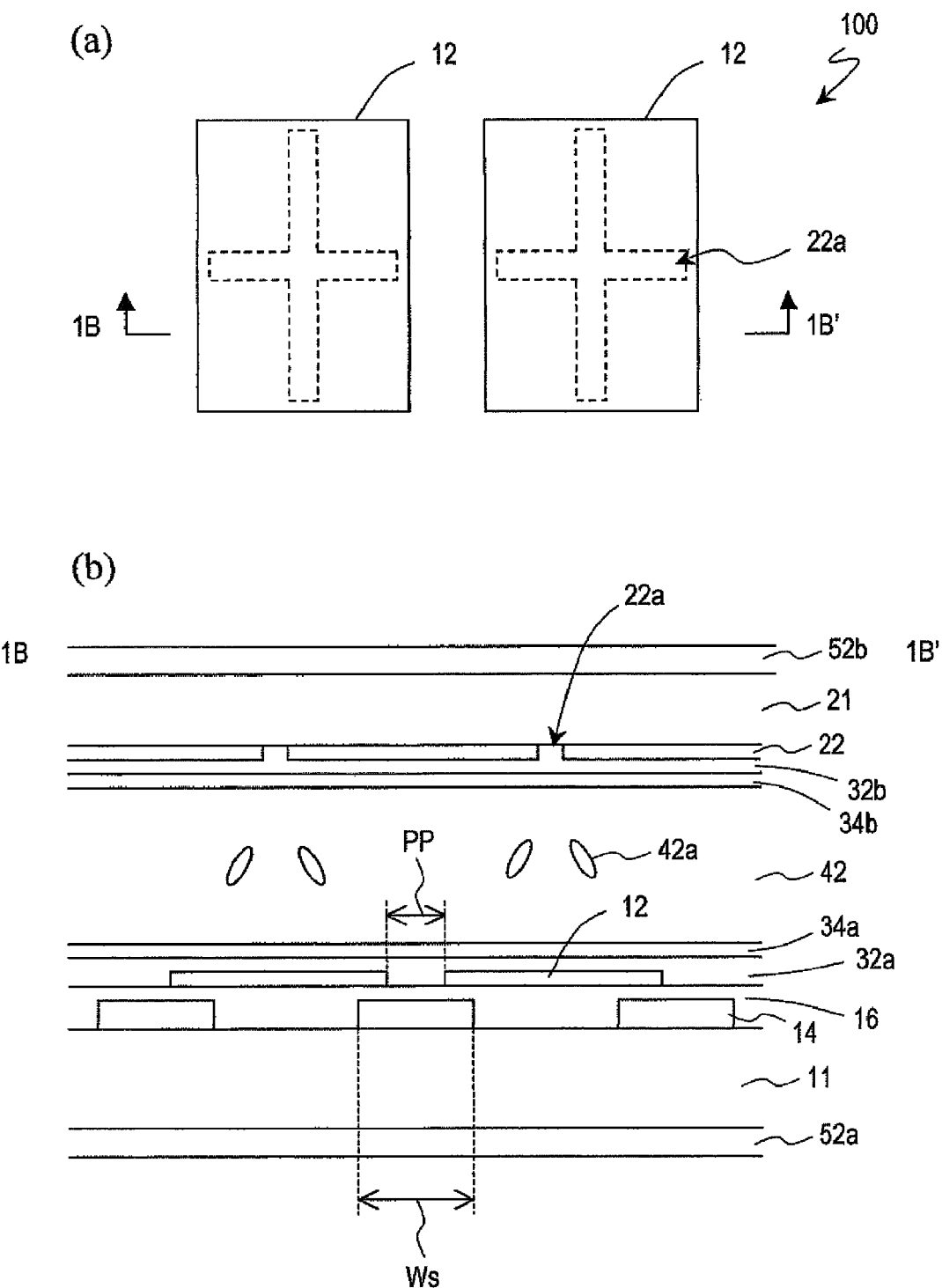
FIG. 1 Diagrams schematically showing a structure of two pixels of a liquid crystal display device 100 of an embodiment of the present invention.

DESCRIPTION OF THE REFERENCE NUMERALS 11, 21 substrate
12 pixel electrode
12a transparent subpixel electrode
12b reflection subpixel electrode
22 counter electrode
22a cruciform opening (slit)
32a, 32b vertical alignment film
34a, 34b alignment sustaining layer
42 liquid crystal layer
42a liquid crystal molecules
52a, 52b polarizing plate
100, 200 liquid crystal display device

BEST MODE FOR CARRYING OUT THE INVENTION

Hereinafter, a structure and operation of a liquid crystal display device of an embodiment of the present invention are described with reference to the drawings. Note that the present invention is not limited to the embodiment described below.

FIG. 1 schematically shows a structure of two pixels of a liquid crystal display device 100 of an embodiment of the present invention. FIG. 1(a) is a plan view. FIG. 1(b) is a schematic cross-sectional view taken along line 1B-1B' of FIG. 1(a).

The liquid crystal display device 100 has a plurality of pixels and includes a pair of substrates 11 and 21 and a pair of polarizing plates 52a and 52b placed in crossed Nicols on the outer sides of the substrates 11 and 21. The liquid crystal display device 100 is configured to display images in a normally black mode. Each pixel has a liquid crystal layer 42 including a nematic liquid crystal material (liquid crystal molecules 42a) whose dielectric anisotropy is negative, and a pixel electrode 12 and a counter electrode 22 which oppose each other via the liquid crystal layer 42. A pair of vertical alignment films 32a and 32b are respectively provided between the pixel electrode 12 and the liquid crystal layer 42 and between the counter electrode 22 and the liquid crystal layer 42. Surfaces of the vertical alignment films 32a and 32b which are closer to the liquid crystal layer 42 are respectively provided with a pair of alignment sustaining layers 34a and 34b which are formed by a photopolymerized material.

As will be described later in details, the alignment sustaining layers 34a and 34b are formed by, after formation of a liquid crystal cell, polymerizing a photopolymerizable monomer contained in a prepared liquid crystal material while applying a voltage across the liquid crystal layer 42. Before the polymerization of the monomer, the alignment of the liquid crystal molecules 42a is controlled by the vertical alignment films 32a and 32b. When a white display voltage is applied, an oblique electric field generated at an edge portion of the pixel electrode 12 and an oblique electric field generated near an opening 22a of the counter electrode 22 form a 4D structure as in the liquid crystal display device 90B shown in FIG. 12. The alignment sustaining layers 34a and 34b function to sustain (memorize) an alignment of the liquid crystal molecules 42a which occurs in the presence of an applied voltage across the liquid crystal layer 42 even after removal of the voltage (in the absence of an applied voltage). Therefore, the pretilt azimuths of the liquid crystal molecules 42a which are regulated by the alignment sustaining layers 34a and 34b (the tilt azimuths of the liquid crystal molecules in the absence of an applied voltage) conform to the azimuths of the directors of the domains of the 4D structure which is formed in the presence of an applied voltage.

Among the pixel electrode 12 and the counter electrode 22, only the counter electrode 22 has at least one opening 22a. That is, the pixel electrode 12 has no opening. In the example described herein, each pixel has one opening 22a. The opening 22a has a cruciform shape and is disposed so as to coincide with the polarization axes of the pair of polarizing plates 52a and 52b. Here, the polarization axis of one of the polarizing plates 52a and 52b extends in a horizontal direction, and the polarization axis of the other extends in a vertical direction. The opening 22a has a cruciform shape which is formed by crossing a slit extending in the horizontal direction and a slit extending in the vertical direction as shown in FIG. 1(a). Note that the cruciform opening 22a provided in the counter electrode 22 is preferably configured such that, when viewed in a direction normal to the substrate, an end of the opening 22a is substantially coincident with an edge of the pixel electrode as shown in FIG. 1(a). This is for the purpose of generating oblique electric fields throughout the liquid crystal layer 42 in the pixel. The end of the opening 22a may extend beyond the edge of the pixel electrode 12. However, if the distance from an opening 22a corresponding to an adjacent pixel electrode 12 is excessively decreased, the resistance value of the counter electrode 22 undesirably increases.

When a predetermined voltage is applied across the liquid crystal layer 42 by providing a potential difference between the pixel electrode 12 and the counter electrode 22, four liquid crystal domains are formed in the liquid crystal layer 42. As described with reference to FIG. 12, the azimuths of the directors that are representative of the orientations of the liquid crystal molecules 42a included in the four liquid crystal domains are different from one another and form an angle of about 45° relative to the polarization axes of the pair of polarizing plates 52a and 52b. That is, the pixels of the liquid crystal display device 100 have a 4D structure.

Figure 12:
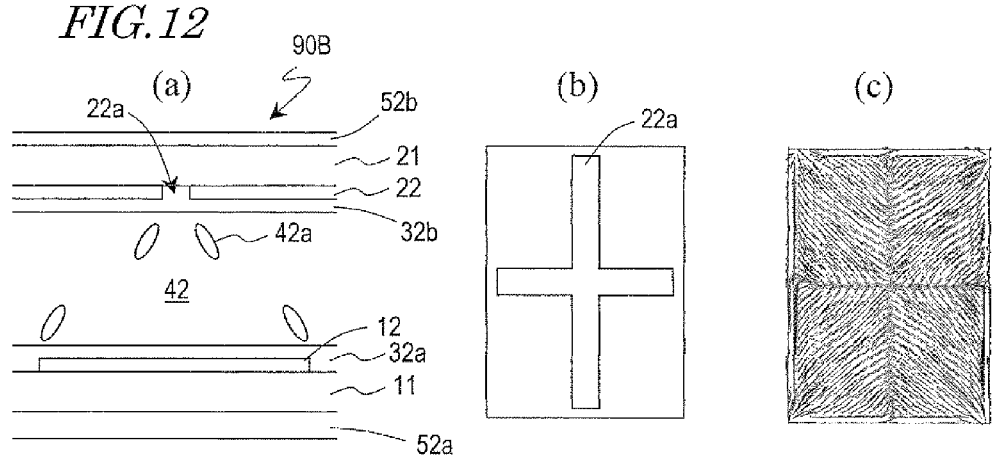
FIG. 12 (a) to (c) are diagrams for briefly illustrating a structure of a VA mode liquid crystal display device 90B to which a structure of Patent Document 3 is applied. (a) is a schematic cross-sectional view of one pixel. (b) is a schematic plan view. (c) is a plan view schematically showing the alignment of liquid crystal molecules in a white display state.
Figure 13:
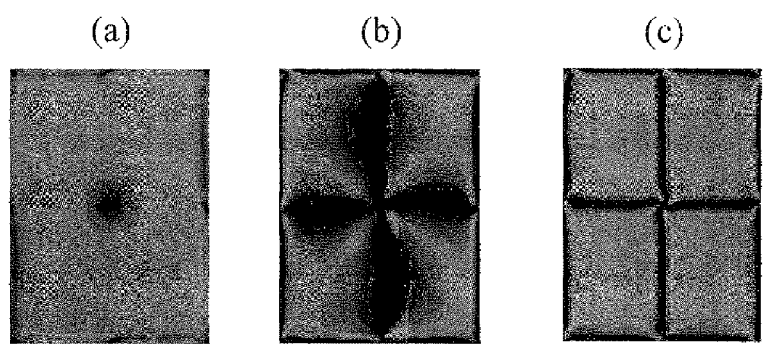
FIG. 13 (a) shows a simulation result of the distribution of transmittance in a pixel in a white display state of the liquid crystal display device 90A. (b) shows a simulation result of the distribution of transmittance in a pixel in a white display state of a modification of the liquid crystal display device 90A from which the ¼-wave plates 72a and 72b are omitted. (c) shows a simulation result of the distribution of transmittance in a pixel in a white display state of the liquid crystal display device 90B.

The liquid crystal display device 100 includes the alignment sustaining layers 34a and 34b, which are not included in the conventional liquid crystal display device 90B shown in FIG. 12. These alignment sustaining layers 34a and 34b function to regulate the pretilt azimuths of the liquid crystal molecules 42a included in regions corresponding to respective ones of the four liquid crystal domains in the absence of an applied voltage across the liquid crystal layer 42.

Since the liquid crystal display device 100 thus uses the 4D structure and linear polarization in combination, the liquid crystal display device 100 has a higher contrast ratio and wider viewing angle characteristics than the conventional CPA mode liquid crystal display device which uses ¼-wave plates, and achieves a higher transmittance than the combination of CPA mode and linear polarization. In the liquid crystal display device 100, the pretilt azimuths are regulated by the alignment sustaining layers 34a and 34b so as to conform to the 4D structure even in the absence of an applied voltage. Therefore, the alignment of the liquid crystal molecules is stable at low gray scale levels than in the liquid crystal display device 903 shown in FIG. 12. Specifically, as will be described later with examples and comparative examples, in the liquid crystal display device 90B, the anchoring force is not sufficient at low gray scale levels so that the four domains cannot stably be formed. For example, the four domains have a varying area ratio, and/or the proportion of liquid crystal molecules in each domain which are oriented in a predetermined direction is not constant. As a result, the problem of asymmetric viewing angle characteristics arises.

The liquid crystal display device 100 is a TFT-based liquid crystal display device and includes TFTs and gate bus lines (both not shown), source bus lines 14, and an interlayer insulating film 16 covering these transistors and lines. The TFTs are ON/OFF-controlled by scan signals supplied to the gate bus lines (not shown). When a TFT is ON, a display signal is supplied from the source bus line 14 to the pixel electrode 12. Providing the interlayer insulating film 16 formed of a transparent organic resin enables an edge portion of the pixel electrode 12 to be laid over the source bus line 14, so that the pixel aperture ratio can be improved. For example, the space between two of the pixel electrodes 12 which are adjacent in a row direction, PP, is 5 μm, and the width of the source bus line 14, Ws, is 6 μm. As a matter of course, a liquid crystal display device of the present invention is not limited to this example and is not limited to TFT-based devices.

The alignment sustaining layers 34a and 34b are formed using a technology called "Polymer Sustained Alignment Technology" (sometimes referred to as "PSA technology"). Specific fabrication methods are described in Patent Documents 4 and 5. The entire disclosures of these documents are incorporated by reference in this specification. Here, a liquid crystal panel is fabricated by the same method as that described in Patent Document 5 (Example 5).

A liquid crystal display panel for the liquid crystal display device 100 is fabricated using a material that contains a photopolymerizable monomer in the proportion of not less than 0.1 mass % and not more than 0.5 mass % relative to a nematic liquid crystal material whose dielectric anisotropy is negative. The photopolymerizable monomer used herein may be a diacrylate or dimethacrylate monomer which has a liquid crystal skeleton. The liquid crystal display panel includes substantially the same components as those of the liquid crystal display device 100 except that the liquid crystal material contains the monomer, that the alignment sustaining layers 34a and 34b are not formed, and that the polarizing plates 52a and 52b are not provided. This configuration corresponds to a modification of the liquid crystal display device 90B shown in FIGS. 12(a) and 12(b) from which the polarizing plates 52a and 52b are removed.

The liquid crystal layer of this liquid crystal display panel (containing the above-described monomer) is irradiated with UV light (e.g., i-line at the wavelength of 365 nm, about 20 mW) of about 20 J/cm² while 10 V, which is higher than the white display voltage (e.g., 4.5 V), is applied across the liquid crystal layer. As previously described in conjunction with the liquid crystal display device 90B with reference to FIG. 12(c), when a voltage is applied across the liquid crystal layer, four domains are formed in the liquid crystal layer by electric fields generated between the counter electrode 22 which has the cruciform opening 22a and the pixel electrode 12, such that the azimuthal angles of the directors of the four domains are 45°, 135°, 225°, and 315°. The UV irradiation causes polymerization of the monomer to produce a photopolymerized material. The photopolymerized material forms alignment sustaining layers on the vertical alignment films for fixing the above alignment of the liquid crystal molecules. A series of steps for photopolymerizing a monomer while applying a predetermined voltage not lower than the white display voltage in order to form alignment sustaining layers is sometimes referred to as "PSA process".

Figure 2:
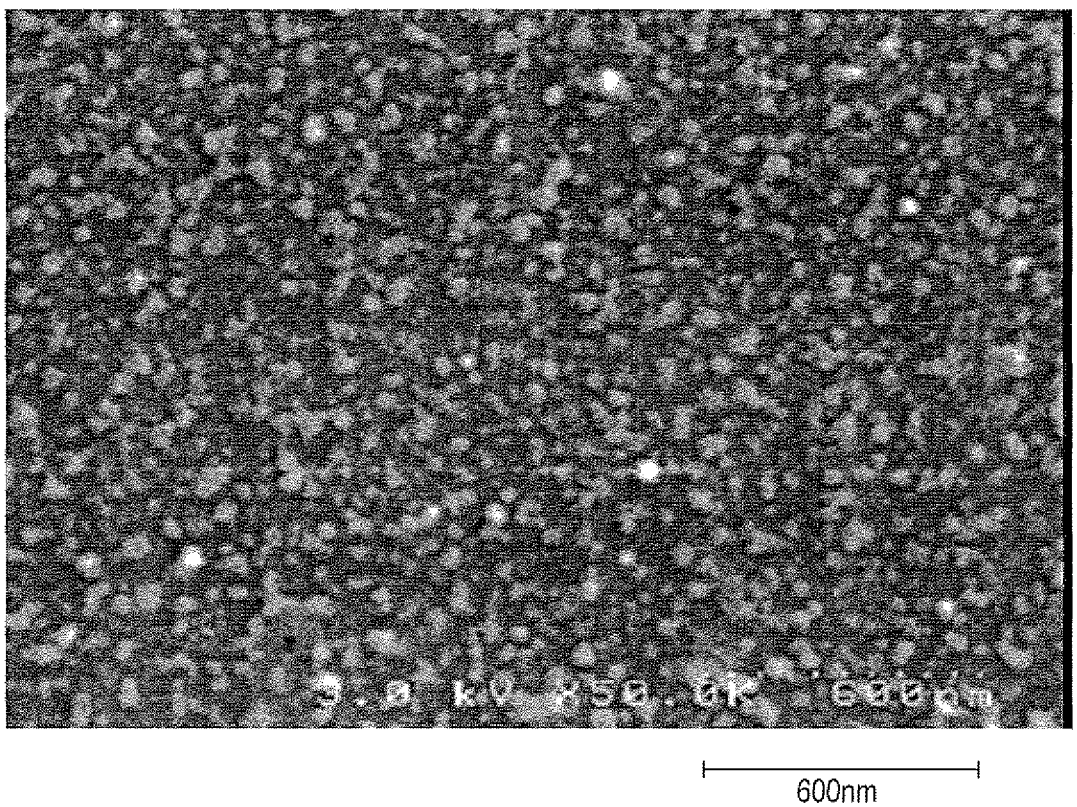
FIG. 2 A SEM image of an alignment sustaining layer included in a liquid crystal display device of an embodiment of the present invention.

An example of the alignment sustaining layers 34a and 34b is described as to the structure with reference to FIG. 2. A SEM image shown in FIG. 2 is a result of a SEM observation of a surface of the alignment sustaining layer. Specifically, a sample of a liquid crystal display panel fabricated as described above was disassembled, and thereafter, the liquid crystal material was removed from the disassembled sample. A surface of the alignment sustaining layer of the resultant sample was then washed with a solvent and observed by SEM.

As seen from FIG. 2, the alignment sustaining layer contains particles of the photopolymerized material with the particle size of 50 nm or less. The photopolymerized material may not necessarily cover the entire surfaces of the alignment films. The surfaces of the alignment films may be partially exposed. The liquid crystal molecules aligned according to electric fields generated in the liquid crystal layer are fixed by the photopolymerized material, so that the alignment of the liquid crystal molecules is sustained even in the absence of an electric field. After the formation of the alignment sustaining layers over the vertical alignment films, the alignment sustaining layers regulate the pretilt directions of the liquid crystal molecules.

Figure 3:
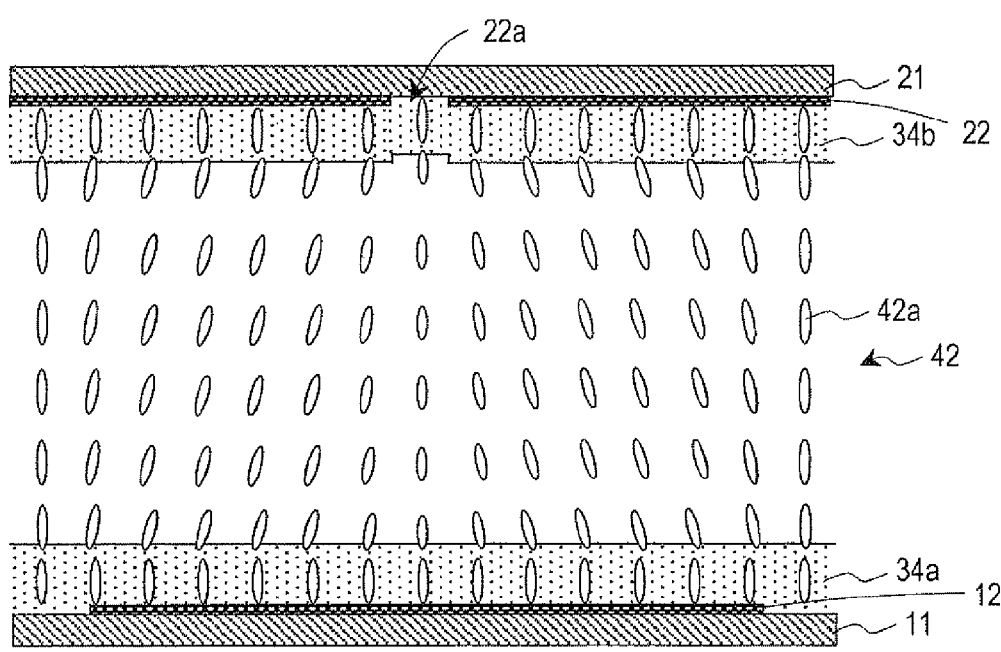
FIG. 3 Diagrams corresponding to the cross-sectional view of one pixel of the liquid crystal display device 100 taken along line 1B-1B' of FIG. 1. (a) schematically shows an alignment of liquid crystal molecules 42a in a black display state (in the absence of an applied voltage). (b) schematically shows an alignment of liquid crystal molecules 42a in a white display state (in the presence of an applied voltage).
Figure 3:
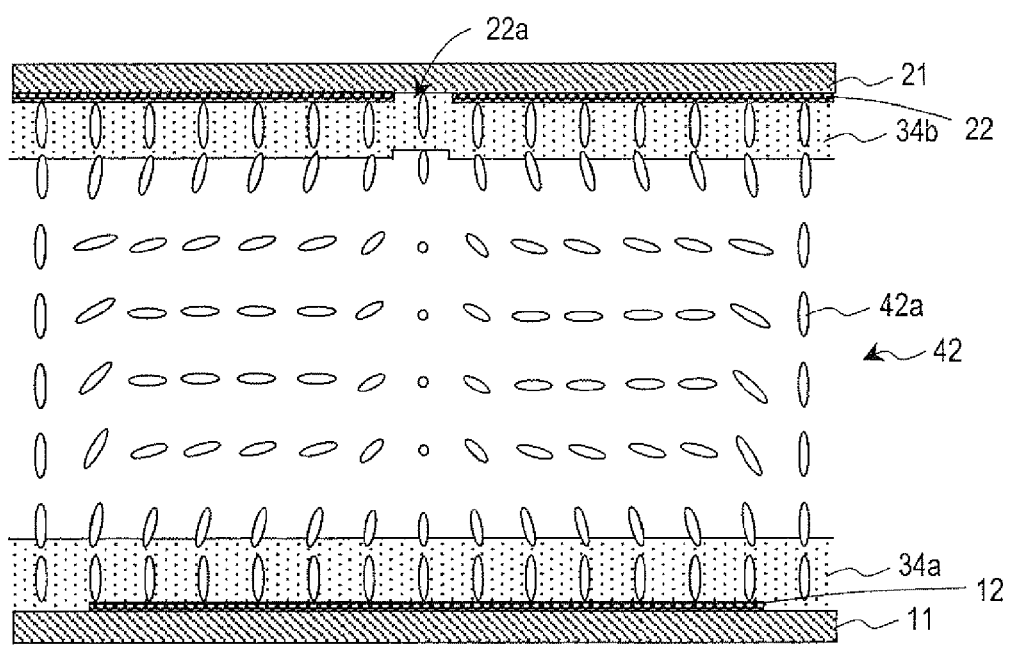
Figure 4:
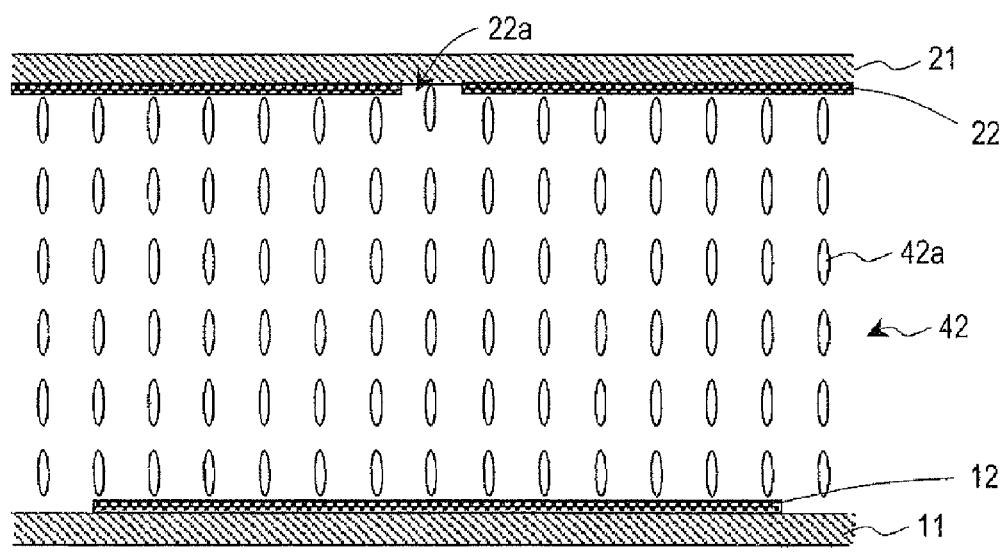
FIG. 4 A cross-sectional view of a pixel of a liquid crystal display device 90B. (a) schematically shows an alignment of liquid crystal molecules 42a in a black display state (in the absence of an applied voltage). (b) schematically shows an alignment of liquid crystal molecules 42a in a white display state (in the presence of an applied voltage).
Figure 4:
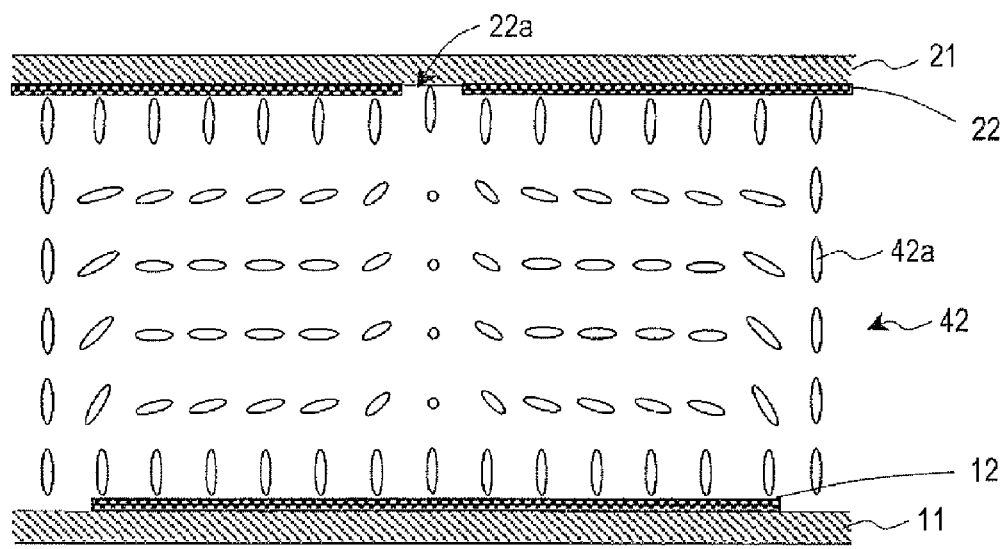

The function of the alignment sustaining layers 34a and 34b is described with reference to FIG. 3 and FIG. 4. FIG. 3 is a cross-sectional view of one pixel of the liquid crystal display device 100 of the embodiment taken along line 1B-1B' of FIG. 1. FIG. 3(a) shows an alignment of the liquid crystal molecules 42a in a black display state (in the absence of an applied voltage). FIG. 3(b) shows an alignment of the liquid crystal molecules 42a in a white display state (in the presence of an applied voltage). On the other hand, FIG. 4 is a cross-sectional view of a pixel of the liquid crystal display device 90B shown in FIGS. 12(a) and 12(b) (which corresponds to a modification of the liquid crystal display device 100 from which the alignment sustaining layers 34a and 34b are removed). FIG. 4(a) shows an alignment of the liquid crystal molecules 42a in a black display state (in the absence of an applied voltage). FIG. 4(b) shows an alignment of the liquid crystal molecules 42a in a white display state (in the presence of an applied voltage). Note that, in FIG. 3 and FIG. 4, the vertical alignment films 32a and 32b are not shown.

First refer to FIG. 4, with which an alignment of the liquid crystal molecules 42a in the presence of oblique electric fields is described. As shown in FIG. 4(a), in the absence of an applied voltage, the liquid crystal molecules 42a are vertically oriented by the vertical alignment films (not shown). On the other hand, in a white display state, an electric field generated at an edge portion of the pixel electrode 12 and an oblique electric field generated near the opening 22a of the counter electrode 22 regulate the alignment of the liquid crystal molecules 42a. The liquid crystal molecules 42a in the central part of the liquid crystal layer 42 are oriented such that the long axes of the molecules are perpendicular to the electric fields (because of their negative dielectric anisotropy). Since four domains are formed such that the azimuthal angles of the directors are 45°, 135°, 225°, and 315° when viewed in a direction normal to the liquid crystal layer 42 as shown in FIG. 12(c), the liquid crystal molecules 42a are twisted relative to the opening 22a that is assumed as the center. Therefore, in FIG. 4(b), the liquid crystal molecules 42a in a region corresponding to the opening 22a are oriented in a direction perpendicular to the sheet surface of the drawing. The liquid crystal molecules 42a in the closest vicinity of the vertical alignment films (not shown) are under the strong anchoring effect of the vertical alignment films and are therefore oriented vertical to the surfaces of the vertical alignment films even in a white display state.

Next, refer to FIGS. 3(a) and 3(b). The liquid crystal display device 100 includes the alignment sustaining layers 34a and 34b. The alignment sustaining layers 34a and 34b function to fix an alignment of the liquid crystal molecules 42a which occurs in the presence of an electric fields. Specifically, the monomer is polymerized as described above to form the alignment sustaining layers 34a and 34b during a period when the liquid crystal molecules 42a are in the alignment shown in FIG. 4(b) (the alignment of molecules in a plane of the liquid crystal layer is as shown in FIG. 12(c)), so that this alignment of the liquid crystal molecules 42a is fixed.

Note that, as shown FIG. 4(b), the liquid crystal molecules 42a in the closest vicinity of the vertical alignment films are under the strong anchoring effect and are therefore oriented vertical to the surfaces of the vertical alignment films even in the presence of a voltage which is to be applied during light irradiation (e.g., about 10 V which is higher than the white display voltage). Thus, the liquid crystal molecules 42a fixed by the alignment sustaining layers 34a and 34b formed over the vertical alignment films only have a slight tilt (1° to 5°) from the vertical direction (pretilt angle of 85° to 89°) as schematically shown in FIG. 3(a). As seen from the comparison of FIG. 3(a) and FIG. 3(b), the alignment of the liquid crystal molecules 42a fixed by the alignment sustaining layers 34a and 34b scarcely changes even when a voltage is applied.

The liquid crystal display device 100 of an embodiment of the present invention has the alignment sustaining layers 34a and 34b and therefore exhibits an alignment of the liquid crystal molecules pretilted in predetermined directions as shown in FIG. 3(a) even in the absence of an applied voltage. The alignment which occurs in this condition conforms to the alignment of the liquid crystal molecules 42a which occurs in a white display state (in the presence of an applied voltage) as shown in FIG. 3(b). As a result, the alignment of the liquid crystal molecules is advantageously stable even at low gray scale levels.

Figure 5:
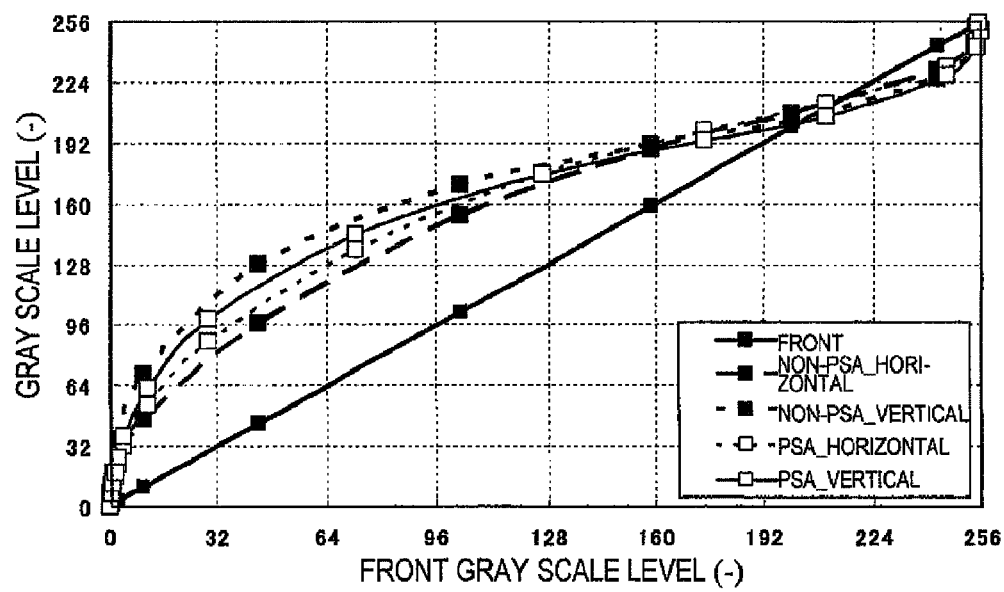
FIG. 5 (a) and (b) are graphs for illustrating the difference in gamma characteristic which is caused due to the presence or absence of the PSA process. Specifically, they are graphs showing the gamma characteristics of liquid crystal display devices which are obtained by simulation.
Figure 5:
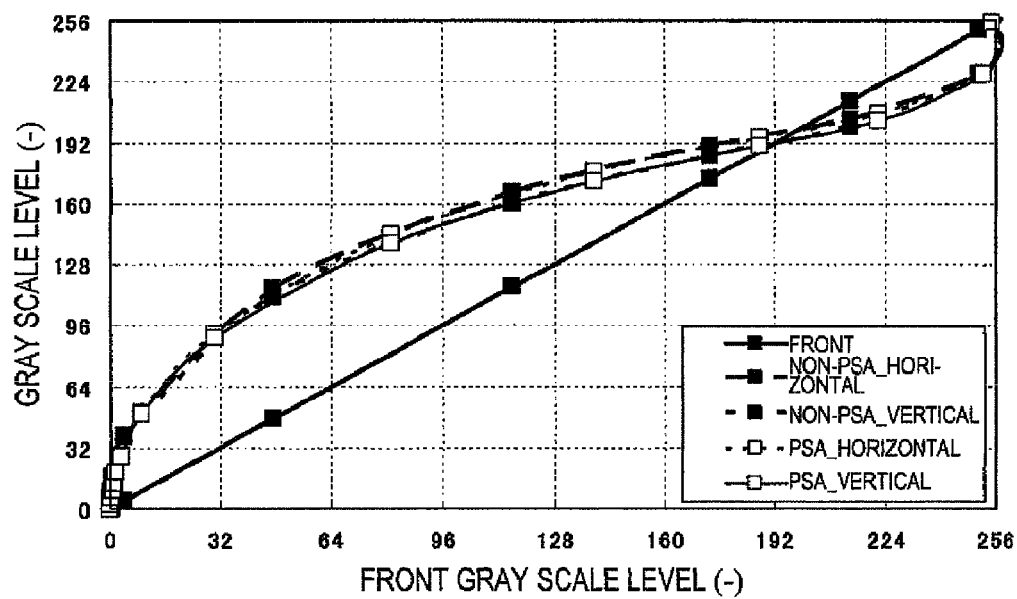

Next, the effects resulting from application of the PSA technology (i.e., provision of the alignment sustaining layers) are described in terms of optical characteristics with reference to the gamma characteristics shown in FIGS. 5(a) and 5(b). FIGS. 5(a) and 5(b) are graphs showing the gamma characteristics of a liquid crystal display device which were obtained by simulation. The abscissa axis represents the gray scale levels which are to be displayed (herein, 256 gray scale levels from "0" to "255"), and the ordinate axis represents the gray scale levels which are actually observed. Each graph shows gamma characteristics obtained by oblique viewing angle observation of a liquid crystal display device which is designed such that a predetermined gamma characteristic (gamma=2.2) is supposed to be obtained when observed from a position in front of the display device (in a direction perpendicular to the display surface). Specifically, the gamma characteristics were obtained for a PSA device and a non-PSA device under the conditions that the viewing angle (the angle inclined from the normal of the display surface (polar angle)) is 45°, and the azimuth of the inclination of the viewing angle is a horizontal direction (3 o'clock direction, azimuthal angle 0°) or a vertical direction (12 o'clock direction, azimuthal angle 90°). To examine the effects of an oblique electric field generated at an edge portion of a pixel electrode, FIG. 5(a) shows the results from the pixel pitch of 25.5 μm×40.0μm (the aspect ratio is 1.6), and FIG. 5(b) shows the results from the pixel pitch of 59.0 μm×61.0 μm (the aspect ratio is 1:1). Unless otherwise specified, the aspect ratio is expressed as the vertical length relative to the horizontal length that is fixed to 1. In general, the horizontal length is shorter than the vertical length. Note that the pixel size is slightly smaller than the pixel pitch.

First refer to FIG. 5(a) to compare the gamma characteristics for the non-PSA device between the vertically-inclined viewing direction and the horizontally-inclined viewing direction. The difference between these characteristics is small at gray scale levels of 160/255 or higher. However, it becomes larger at lower gray scale levels. At gray scale levels of 128/255 or lower, the difference is very large. This means that, in the case of the non-PSA device, the viewing angle characteristics are disadvantageously asymmetric. On the other hand, in the case of the PSA device, the difference in gamma characteristic between the vertically-inclined viewing direction and the horizontally-inclined viewing direction is only a small difference in the range from gray scale level 255/255 to gray scale level 128/255. The difference becomes larger at gray scale levels lower than 128/255 but is not more than about a half of that of the non-PSA device. As understood from this, using the PSA technology to form the alignment sustaining layers enables stable alignment of the liquid crystal molecules. As a result, the problem of asymmetric viewing angle characteristics would not occur.

Next, referring to FIG. 5(b), i can be understood that the difference in gamma characteristic between the vertically-inclined viewing direction and the horizontally-inclined viewing direction is small even in the case of the non-PSA device. This is because the aspect ratio of the pixel is 1:1, and the alignment distribution of the liquid crystal molecules is therefore symmetric. In this case also, the difference in gamma characteristic between the vertically-inclined viewing direction and the horizontally-inclined viewing direction is smaller in the PSA device than in the non-PSA device.

In the case of the PSA device, the liquid crystal molecules have a pretilt so that the molecules can smoothly change their orientations according to the electric fields. Therefore, advantageously, the alignment of the liquid crystal molecules can be stabilized, and the response characteristics of the liquid crystal molecules can be improved.

Figure 6:
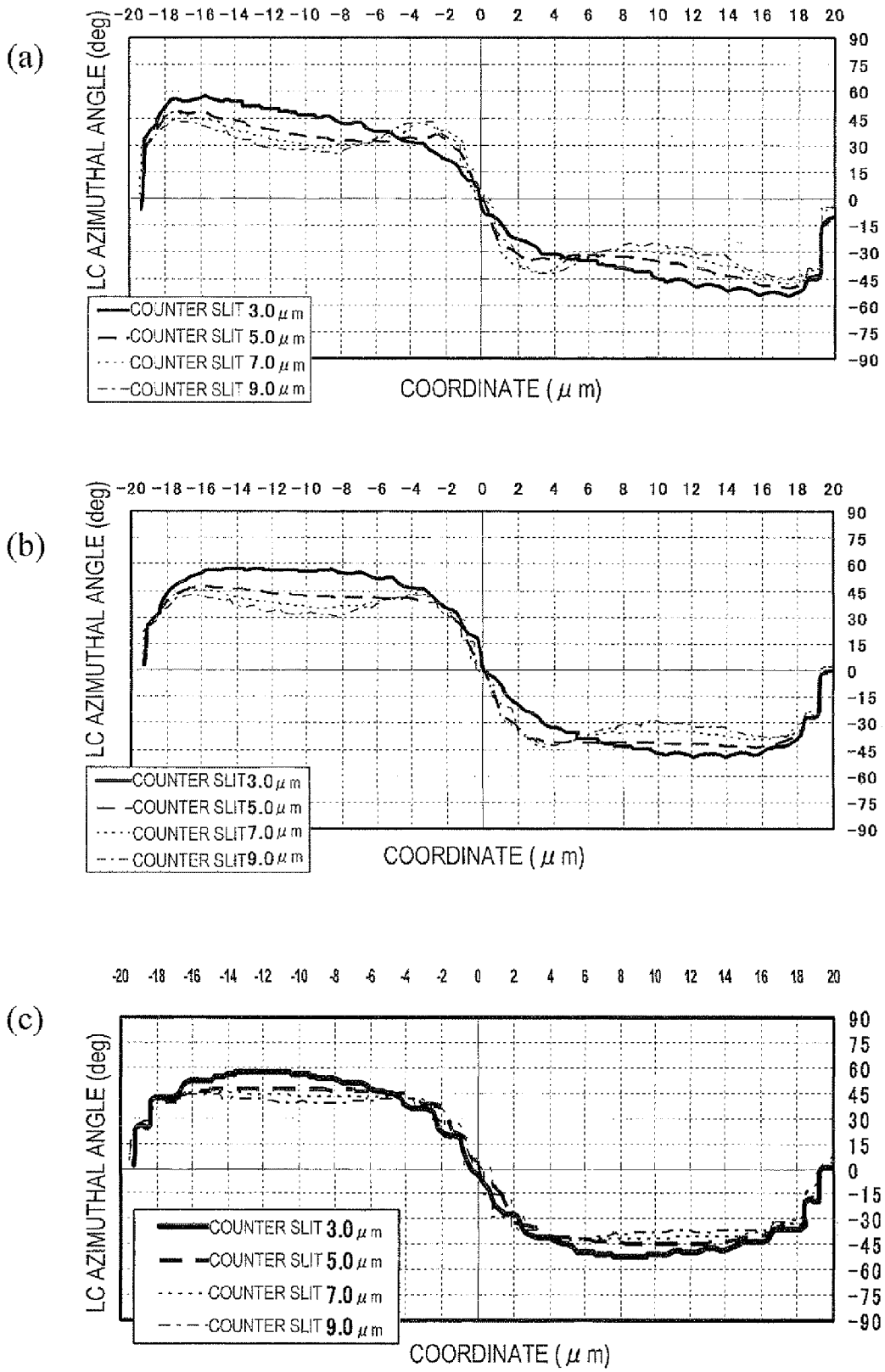
FIG. 6 Graphs showing the distributions of the azimuths of the orientations of liquid crystal molecules with different widths of an opening 22a. (a) shows the distributions during application of 2.5 V across a liquid crystal layer (intermediate gray scale level display state). (b) shows the distributions during application of 4.5 V across a liquid crystal layer (white display state). (c) shows the distributions during application of 10 V which is higher than the white voltage.

Next, the optimum value for the width of the cruciform opening 22a is described with reference to FIG. 6 and FIG. 7. FIG. 6 shows graphs which illustrate the distributions of the azimuths of the orientations of the liquid crystal molecules for different widths of the opening 22a (widths of counter slit). In the examples of FIG. 6, the pixel pitch is 25.5 μm×40.0 μm (aspect ratio 1.6) as in the cases of FIG. 5(a).

In FIGS. 6(a) to 6(c), the abscissa axis represents the position along the vertical direction of the pixel and specifically represents the position on a line passing through the centers of two domains vertically adjacent to each other. Assuming that the horizontal slit of the cruciform opening 22a of the pixel electrode 12 shown in FIG. 1(a) is identical with the X-axis and the vertical slit is identical with the Y-axis as in the above examples, the azimuthal angles of the directors of the respective domains formed in the first, second, third, and fourth quadrants of the pixel are 45°, 135°, 225°, and 315°. Here, the distributions of the azimuths of the orientations of the liquid crystal molecules of the domains formed in the second and third quadrants are shown. Note that 135° is expressed as "−45°" which is an equivalent angle. FIG. 6(a) illustrates the distributions during application of 2.5 V across the liquid crystal layer (intermediate gray scale level display state). FIG. 6(b) illustrates the distributions during application of 4.5 V across the liquid crystal layer (white display state). FIG. 6(c) illustrates the distributions during application of a voltage higher than the white voltage (10 V).

First, as shown in FIG. 6(a), it is understood that a small number of liquid crystal molecules are oriented in the azimuth of 45° or −45° when the voltage applied across the liquid crystal layer is low. When the width of the slit is 5.0 μm or 7.0 μm, only a small part of the liquid crystal molecules near an edge of the pixel electrode and near the slit are oriented in the azimuth of 45° or −45°.

Next, as shown in FIG. 6(b), it is understood that, when the slit width is 5.0 μm, liquid crystal molecules oriented in the azimuth of 45° or −45° exist in a wide range during application of the white display voltage (4.5 V).

As shown in FIG. 6(c), it is understood that, when the slit width is 5.0 μm, liquid crystal molecules oriented in the azimuth of 45° or −45° exist in a still wider range during application of 10 V which is higher than the white voltage. Even when the slit width is 7.0 μm or 9.0 μm, the liquid crystal molecules oriented in the azimuth of 45° or −45° exist in a wide range.

In view of the foregoing, it can be said that, even when the pitch of the pixels is relatively small, the width of the slit is preferably 5.0 μm or more in order to exert a sufficient anchoring force.

As described above, the width of the slit is 5.0 μm or more such that the proportion of liquid crystal molecules oriented in a predetermined azimuth (45° relative to the transmission axis of the polarizing plate) is increased, whereby the transmittance (display luminance) can be increased. However, as the width of the slit increases, a region in which the voltage applied across the liquid crystal layer is insufficient increases, so that the display luminance decreases. In view of such, a result of an examination as to the relationship between the slit width and the transmittance is described with reference to FIG. 7.

Figure 7:
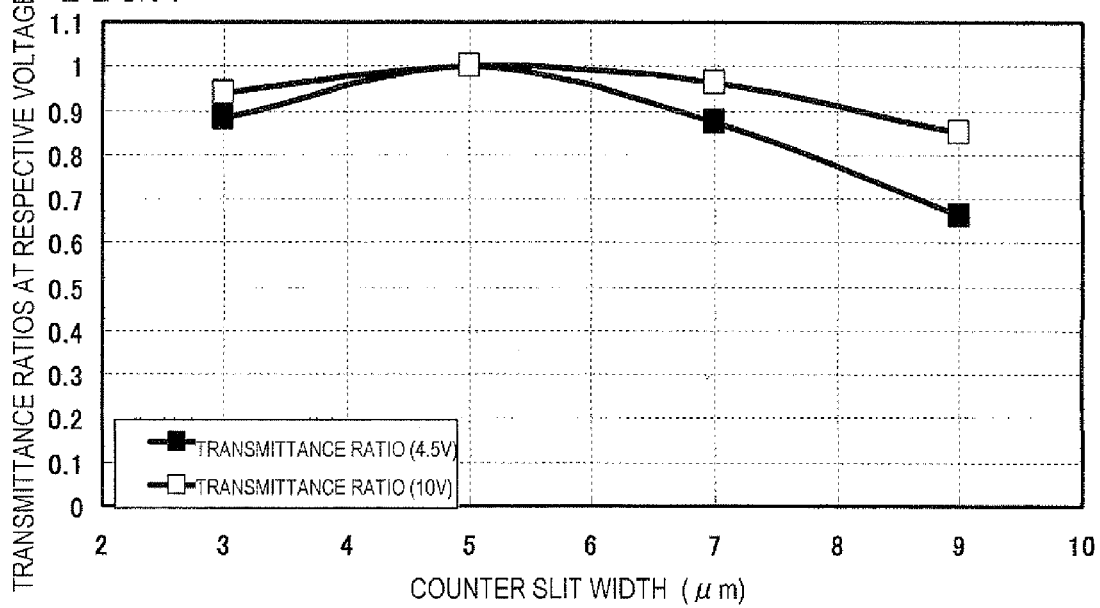
FIG. 7 A graph showing the relationship between the slit width and the transmittance. Abscissa axis represents the slit width. Ordinate axis represents the transmittance ratio where the transmittance achieved with the slit width of 5.0 μm is fixed to 1.

In the graph shown in FIG. 7, the ordinate axis represents the transmittance ratio where the transmittance for the slit width of 5.0 μm is 1, and the abscissa axis represents the width of the slit. As seen from FIG. 7, the optimum slit width is 5.0 μm in terms of transmittance. Note that, if the width of the slit is 7.0 μm or less, application of 10 V can achieve the transmittance ratio of 0.95. Specifically, if the slit width is 7.0 μm or less, application of 10 V can realize an alignment desired for obtaining a 4D structure. Therefore, it can be said that the PSA process may preferably be performed under these conditions.

Figure 8:
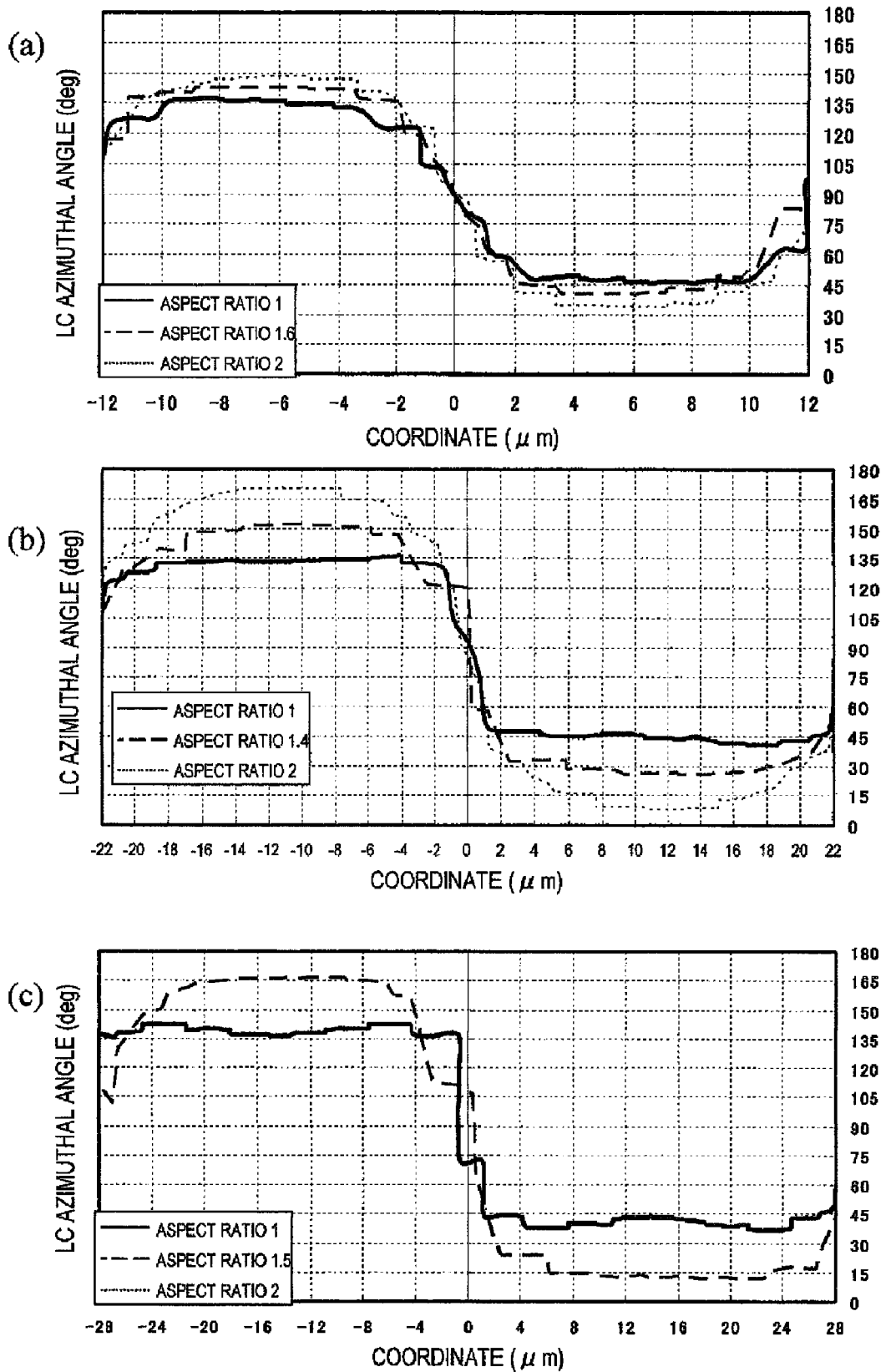
FIG. 8 Graphs showing the distributions of the azimuths of the orientations of liquid crystal molecules with different pixel aspect ratios (during application of 4 V). (a) shows the distributions achieved when the horizontal pitch of the pixels is 25.5 μm. (b) shows the distributions achieved when the horizontal pitch of the pixels is 46.5 μm. (c) shows the distributions achieved when the horizontal pitch of the pixels is 59.0 μm.
Figure 9:
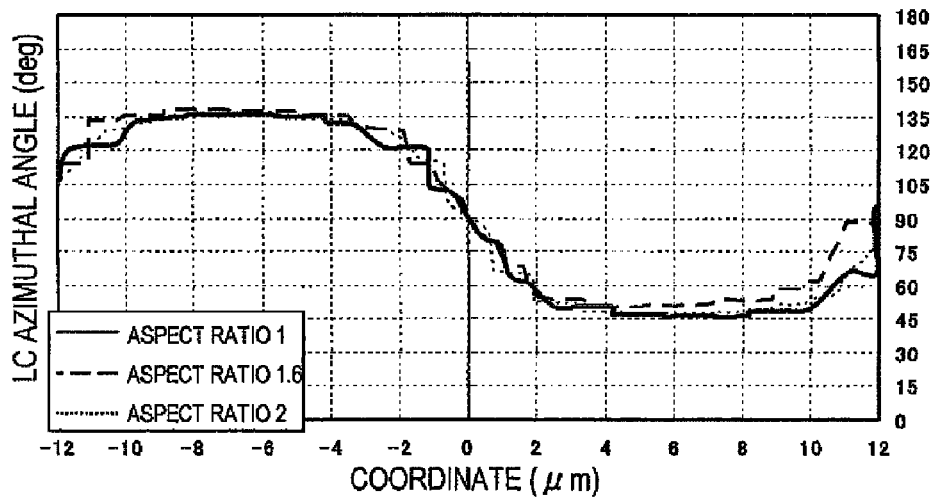
FIG. 9 Graphs showing the distributions of the azimuths of the orientations of liquid crystal molecules with different pixel aspect ratios (during application of 10 V). (a) shows the distributions achieved when the horizontal pitch of the pixels is 25.5 μm. (b) shows the distributions achieved when the horizontal pitch of the pixels is 46.5 μm. (c) shows the distributions achieved when the horizontal pitch of the pixels is 59.0 μm.
Figure 9:
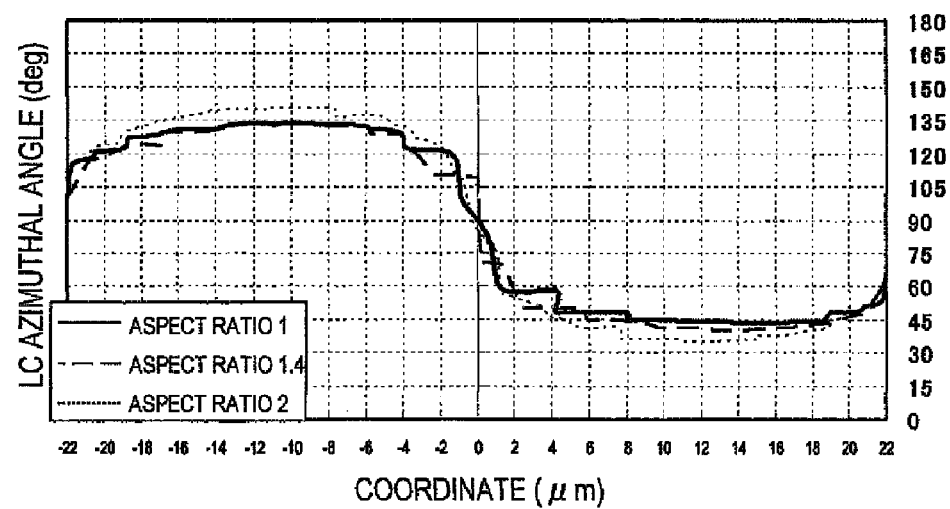
Figure 9:
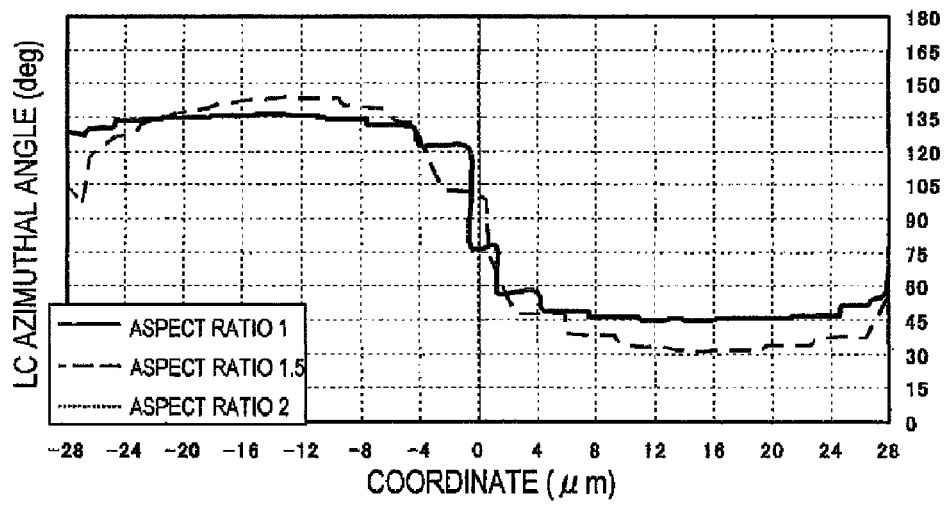

Next, the result of an examination as to the effects of the aspect ratio of the pixel on the alignment of the liquid crystal molecules is described with reference to FIG. 8 and FIG. 9. In FIG. 8 and FIG. 9, the abscissa axis represents the position along the horizontal dimension of the pixel and specifically represents the position on a line passing through the centers of two domains horizontally adjacent to each other. Here, the distributions of the azimuths of the orientations of the liquid crystal molecules of the domains formed in the first and second quadrants among the four domains are shown. Note that the slit width is 5.0 μm in any case. In the examples of FIGS. 8(a) to 8(c), the applied voltage is 4.5 V (equivalent to the white display voltage). In the examples of FIGS. 9(a) to 9(c), the applied voltage is 10 V.

In the examples of FIG. 8(a) and FIG. 9(a), the horizontal pitch of the pixels is 25.5 μm. In the examples of FIG. 8(b) and FIG. 9(b), the horizontal pitch of the pixels is 46.5 μm. In the examples of FIG. 8(c) and FIG. 9(c), the horizontal pitch of the pixels is 59.0 μm.

Referring to FIGS. 8(a) to 8(c), when the aspect ratio is 1:1, the proportion of liquid crystal molecules which are oriented in the desired azimuths is sufficiently large irrespective of the pixel pitch. Especially in pixels with the pixel pitch of 59.0 μm, almost all of the liquid crystal molecules are oriented in the desired azimuths. On the other hand, when the aspect ratio is from 1.4 to 1.6, the proportion of liquid crystal molecules oriented in the desired azimuths decreases as the pixel pitch increases. When the pixel pitch is 59.0 μm, only a small part of the liquid crystal molecules are oriented in the desired azimuths. This tendency is greater when the aspect ratio is 2.0. Even in pixels with the pixel pitch of 25.5 the proportion of liquid crystal molecules oriented in the desired azimuths is small.

Next, refer to FIGS. 9(a) to 9(c). Application across the liquid crystal layer of a voltage at 10 V which is not less than the white voltage increases the proportion of liquid crystal molecules oriented in the desired azimuths. It is understood that so long as the aspect ratio is 1.6 or less, a sufficient proportion of liquid crystal molecules are oriented in the desired azimuths even in pixels with the pixel pitch of 59.0 μm.

Thus, so long as the aspect ratio is 1.6 or less and the shorter pixel pitch is 60 μm or less, the orientations of the liquid crystal molecules in the desired azimuths can be fixed by performing the PSA process with application of a voltage at about 10 V. As a matter of course, by further increasing the voltage applied across the liquid crystal layer, the proportion of liquid crystal molecules oriented in the desired azimuths can sufficiently be increased even in a pixel with a still greater pixel aspect ratio and a still greater pixel pitch. However, application of a voltage higher than 10 V to the pixels of a TFT-based liquid crystal display device is not preferable.

Generally, in liquid crystal display devices, three pixels of three primary colors (R, G, and B) constitute one color display pixel which has the aspect ratio of about 1:3. Therefore, diving one pixel into two or more subpixel regions, to each of which the above-described structure is applied, is preferable. Specifically, the pixels are preferably configured such that: a pixel electrode includes a plurality of subpixel electrodes aligned in a line along a certain direction; at least one cruciform opening of the counter electrode includes an opening placed at a position opposing a corresponding one of the plurality of subpixel electrodes; and when a predetermined voltage is applied across the liquid crystal layer, four liquid crystal domains are formed in each of a plurality of subpixel regions which correspond to the plurality of subpixel electrodes on a one-to-one basis. In this case also, as a matter of course, the aspect ratio of each subpixel region is preferably in the range of 1:1 to 1:1.6.

Figure 10:
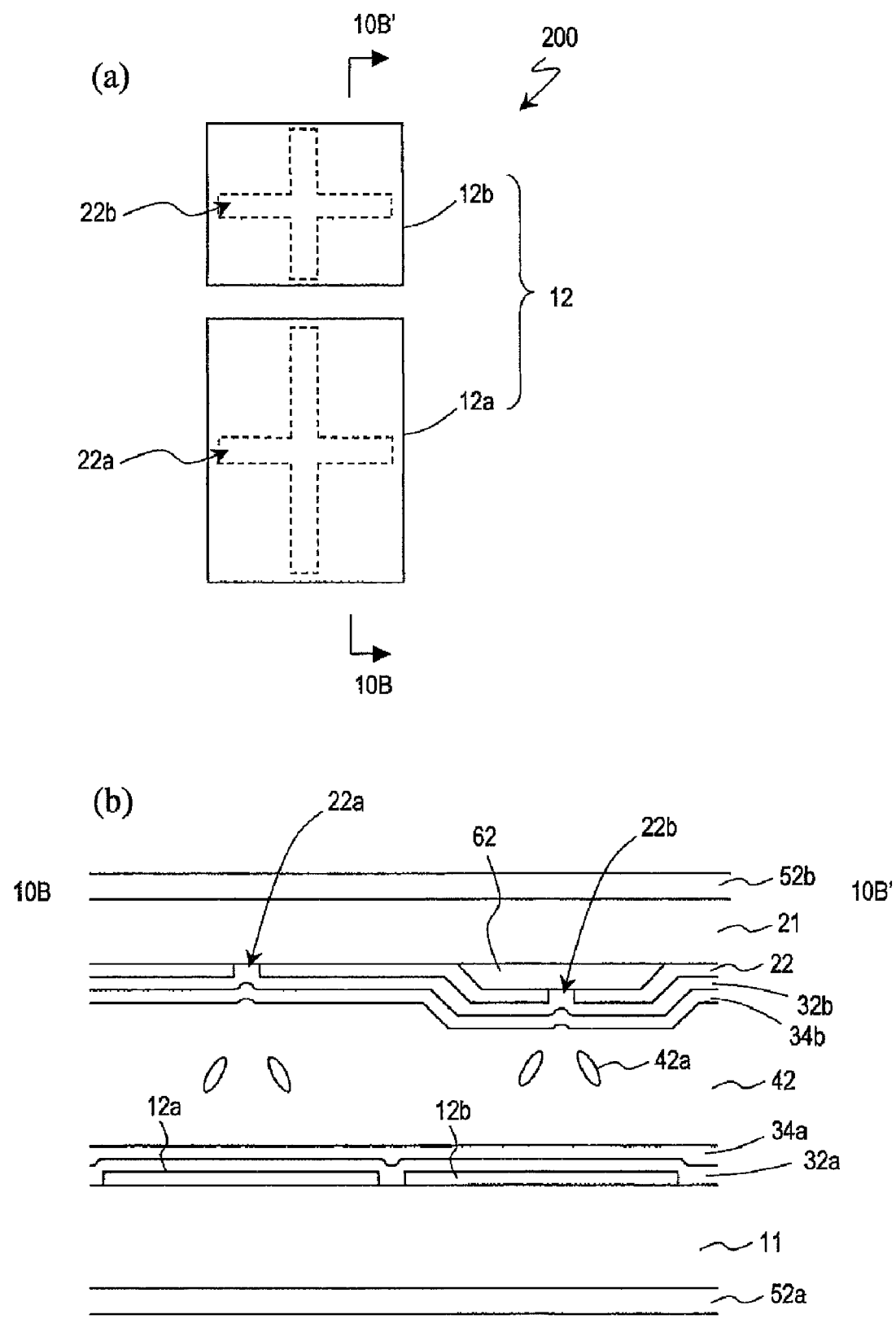
FIG. 10 Diagrams schematically showing a structure of pixels of a transflective type liquid crystal display device 200 of an embodiment of the present invention. (a) is a plan view. (b) is a schematic cross-sectional view taken along line 10B-10B' of (a).
Figure 11:
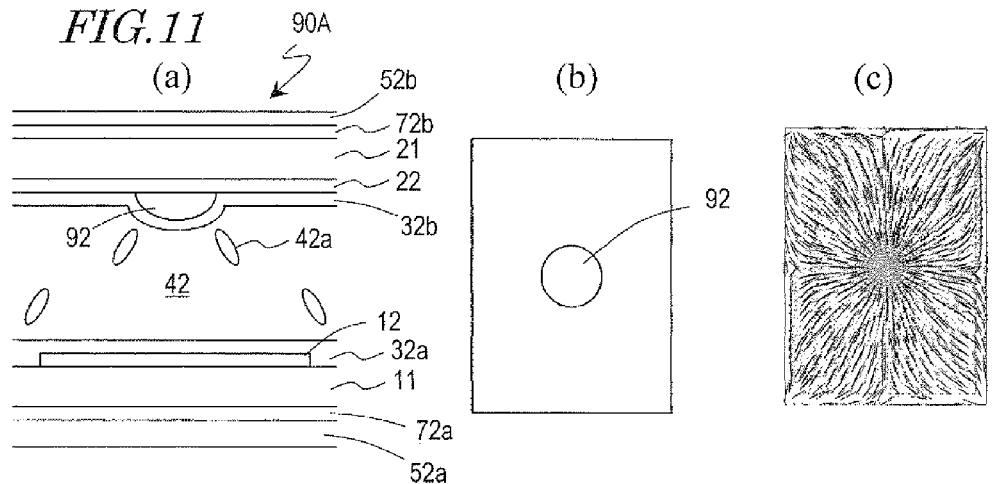
FIG. 11 (a) to (c) are diagrams showing a structure of a CPA mode liquid crystal display device 90A. (a) is a schematic cross-sectional view of one pixel. (b) is a schematic plan view. (c) is a plan view schematically showing the alignment of liquid crystal molecules in a white display state.

Next, a transmission-reflection combination type (or "transflective type") liquid crystal display device 200, which is another embodiment of the present invention, is described with reference to FIG. 10. In the liquid crystal display device 200, each pixel includes two subpixel regions. One of the subpixel regions is a transmission subpixel region for display in the transmission mode, and the other is a reflection subpixel region for display in the reflection mode. FIG. 10(a) is a schematic plan view of one pixel of the liquid crystal display device 200. FIG. 10(b) is a schematic cross-sectional view taken along line 10B-10B' of FIG. 10(a). Note that components which are common among the liquid crystal display device 200 and the liquid crystal display device 100 shown in FIG. 1 are indicated by the common reference numerals, and the description thereof is herein omitted.

As shown in FIG. 10(a), the pixel electrode 12 of the liquid crystal display device 200 includes two subpixel electrodes 12a and 12b which are aligned in a line along a column direction (vertical direction). The subpixel electrode 12a is a transparent electrode formed of, for example, an ITO film. The subpixel electrode 12b is a reflection electrode formed of, for example, an Al film. The counter electrode 22 which opposes the subpixel electrodes 12a and 12b via the liquid crystal layer 42 has a cruciform opening 22a at a position opposing the transparent subpixel electrode 12a and a cruciform opening 22b at a position opposing the reflection subpixel electrode 12b. Thus, when a predetermined voltage is applied across the liquid crystal layer 42, the above-described four liquid crystal domains are formed in each of a transmission subpixel region corresponding to the transparent subpixel electrode 12a and a reflection subpixel region corresponding to the reflection subpixel electrode 12b. For example, the aspect ratio of the transmission subpixel region is 1:1.6, and the aspect ratio of the reflection subpixel region is 1:1.

The liquid crystal display device 200 has a retarder 62 in a region opposing the reflection subpixel electrode 12b as shown in FIG. 10(b). It is provided between the substrate 11 and the substrate 21 which oppose each other via the liquid crystal layer 42 and is therefore referred to as "internal retarder 62". For example, the phase difference of the internal retarder 62 is a quarter wavelength. The internal retarder 62 is disposed such that its slow axis extends in a direction which forms an angle of 45° relative to the transmission axis of the polarizing plate 52b. The internal retarder 62 functions to convert linear polarization transmitted through the polarizing plate 52b to circular polarization. In this configuration, to equalize the optical path length for the light that contributes to the display in the reflection mode and the optical path length for the light that contributes to the display in the transmission mode, the thickness of the liquid crystal layer 42 in the reflection subpixel region is preferably half the thickness of the liquid crystal layer 42 in the transmission subpixel region. The thickness of the liquid crystal layer 42 may be adjusted by, for example, providing a transparent resin layer on a side of the internal retarder 62 which is closer to the substrate 21. The details of the internal retarder are disclosed in, for example, Japanese Laid-Open Patent Publication No. 2003-279957. The entire disclosures of this publication are incorporated by reference in the present specification.

Here, the configuration of one pixel which includes two or more subpixel regions has been described with an example of the transmission-reflection combination type liquid crystal display device 200, to which the present invention is however not limited. Even in transmission-type liquid crystal display devices and reflection-type liquid crystal display devices, the aspect ratio of each subpixel region can be in the range from 1:1 to 1:1.6 by dividing a pixel into a plurality of subpixel regions. Thus, as described above, the effects of oblique electric fields generated at a cruciform opening and an edge portion of a pixel electrode (subpixel electrode) are utilized to stably control the azimuths of the orientations of liquid crystal molecules in each subpixel region, so that a desired 4D structure can be formed.

As described above, the liquid crystal display devices 100 and 200 of the present embodiments use the 4D structure and the linear polarization in combination and therefore have higher transmittances, higher contrast ratios, and wider viewing angle characteristics than those of the conventional CPA mode liquid crystal display device which uses quarter-wave plates. Further, the pretilt azimuths are regulated so as to conform to the 4D structure even in the absence of an applied voltage, and therefore, the alignment of the liquid crystal molecules is stable even at low gray scale levels as compared with the liquid crystal display device 90B shown in FIG. 12. For example, a problem that the four domains have a varying area ratio, and/or a problem that the proportion of liquid crystal molecules in each domain which are oriented in a predetermined direction is not constant, would not arise. As a result, the problem of asymmetric viewing angle characteristics would not arise. As a matter of course, the liquid crystal display devices of the present embodiments have excellent response characteristics as the conventional PSA-processed liquid crystal display devices do.

INDUSTRIAL APPLICABILITY

The present invention is applicable to liquid crystal display devices with relatively small pixel pitches, such as liquid crystal display devices for use in mobile phones.

The invention claimed is:

1. A liquid crystal display device comprising a plurality of pixels and a pair of polarizing plates placed in crossed Nicols, the liquid crystal display device being configured to display an image in a normally black mode, wherein
each of the plurality of pixels includes
a liquid crystal layer including a nematic liquid crystal material whose dielectric anisotropy is negative,
a pixel electrode and a counter electrode opposing each other via the liquid crystal layer,
a pair of vertical alignment films respectively interposed between the pixel electrode and the liquid crystal layer and between the counter electrode and the liquid crystal layer,
a pair of alignment sustaining layers formed by a photopolymerized material on respective surfaces of the pair of vertical alignment films which are closer to the liquid crystal layer, and
at least one cruciform opening provided only in the counter electrode among the pixel electrode and the counter electrode, the cruciform opening being disposed so as to coincide with polarization axes of the pair of polarizing plates,
when a predetermined voltage is applied across the liquid crystal layer, four liquid crystal domains are formed in the liquid crystal layer, azimuths of directors of the four liquid crystal domains that are representative of orientations of liquid crystal molecules included in the four liquid crystal domains being different from one another, and each of the directors forming an angle of about 45° relative to the polarization axes of the pair of polarizing plates, and
when no voltage is applied across the liquid crystal layer, a pretilt azimuth of a liquid crystal molecule included in a region corresponding to each of the four liquid crystal domains is regulated by the alignment sustaining layers.

2. The liquid crystal display device of claim 1, wherein
the pixel electrode includes a plurality of subpixels aligned in a line along a certain direction,
the at least one cruciform opening provided in the counter electrode includes an opening provided at a position opposing each of the plurality of subpixels, and
when a predetermined voltage is applied across the liquid crystal layer, the four liquid crystal domains are formed in each of a plurality of subpixel regions corresponding to the plurality of subpixel electrodes on a one-to-one basis.

3. The liquid crystal display device of claim 2, wherein the plurality of subpixel regions include a transmission subpixel region which performs display in a transmission mode and a reflection subpixel region which performs display in a reflection mode.

4. The liquid crystal display device of claim 3, further comprising an internal retarder selectively provided only in a region corresponding to the reflection subpixel region.

5. The liquid crystal display device of claim 1, wherein the photopolymerized material includes a polymerized material of any one of a diacrylate monomer or a dimethacrylate monomer, and the liquid crystal layer includes the monomer.

6. The liquid crystal display device of claim 1, wherein the pair of alignment sustaining layers include a particle of the photopolymerized material which has a particle diameter of 50 nm or less.

* * * * *